United States Patent
Kurtz

(10) Patent No.: US 7,284,366 B2
(45) Date of Patent: Oct. 23, 2007

(54) SYSTEM AND METHOD FOR OPERATING AN ENGINE HAVING AN EXHAUST GAS RECIRCULATION SYSTEM

(75) Inventor: Eric Kurtz, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 11/238,969

(22) Filed: Sep. 28, 2005

(65) Prior Publication Data
US 2007/0068157 A1    Mar. 29, 2007

(51) Int. Cl.
*F01N 3/00* (2006.01)

(52) U.S. Cl. ............... 60/277; 60/274; 60/278; 60/285; 60/297; 60/311

(58) Field of Classification Search .......... 60/274, 60/278, 280, 295, 297, 311
See application file for complete search history.

(56) References Cited

U.S. PATENT DOCUMENTS

| | | | |
|---|---|---|---|
| 5,941,066 A * | 8/1999 | Araki et al. | 60/280 |
| 6,301,887 B1 | 10/2001 | Gorel et al. | |
| 6,672,050 B2 * | 1/2004 | Murata et al. | 60/284 |
| 6,742,335 B2 * | 6/2004 | Beck et al. | 60/605.2 |
| 6,820,599 B2 | 11/2004 | Kurtz et al. | |
| 6,899,090 B2 * | 5/2005 | Arnold | 123/568.12 |
| 6,952,918 B2 * | 10/2005 | Imai et al. | 60/295 |
| 6,969,413 B2 * | 11/2005 | Yahata et al. | 55/282.3 |
| 6,981,370 B2 * | 1/2006 | Opris et al. | 60/311 |
| 2004/0093866 A1 | 5/2004 | Ishikawa | |

FOREIGN PATENT DOCUMENTS

EP    1156202    11/2001

* cited by examiner

Primary Examiner—Thomas Denion
Assistant Examiner—Diem Tran
(74) Attorney, Agent, or Firm—Allan J. Lippa; Alleman Hall McCoy Russel & Tuttle LLP

(57) ABSTRACT

In an apparatus having an internal combustion engine, a compressor for compressing engine intake gases, a particulate filter for filtering particulate matter from engine exhaust, an exhaust gas recirculation (EGR) system for recirculating exhaust gases from a location downstream of the particulate filter to a location upstream of the compressor, and a particulate filter function detector configured to detect a failure of the particulate filter, a method of operating the engine, including receiving a signal from the particulate filter function detector, comparing the signal from the particulate filter function detector to a predetermined signal threshold, determining if the signal received from the particulate filter function detector meets a predetermined condition relative to the predetermined signal threshold; and reducing a flow of exhaust gas through the EGR system if the signal meets the predetermined condition.

24 Claims, 2 Drawing Sheets

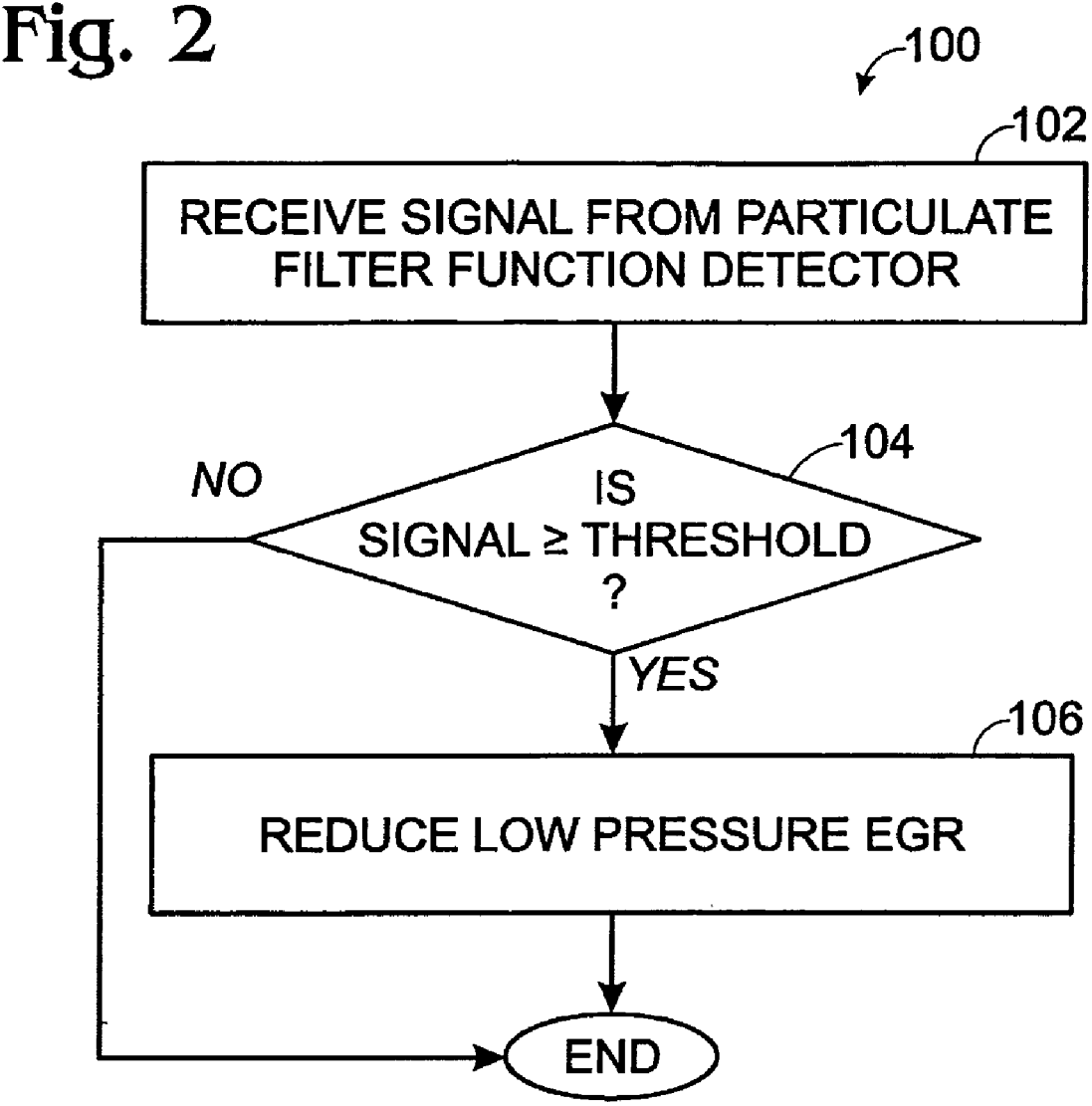

SYSTEM AND METHOD FOR OPERATING AN ENGINE HAVING AN EXHAUST GAS RECIRCULATION SYSTEM

TECHNICAL FIELD

The present application relates to the field of automotive emission control systems and methods.

BACKGROUND AND SUMMARY

Controlling nitrogen oxide ("$NO_x$") emissions in internal combustion engines has posed significant challenges to the automotive industry. One method for controlling $NO_x$ emissions is generally known as exhaust gas recirculation (EGR). This method utilizes a conduit to recirculate exhaust gases into the engine intake. The recirculated exhaust gases absorb heat in the combustion chamber, thereby lowering the temperatures within the combustion chamber and lowering the production of $NO_x$. A cooler may be provided along the EGR conduit to cool the recirculated exhaust gases and thereby help further lower combustion temperatures.

In a turbocharged engine, two types of EGR systems may be employed. The first may be referred to as a high pressure EGR system, and recirculates exhaust from a location upstream of the exhaust turbine. The second may be referred to as a low pressure EGR system, and recirculates exhaust from a location downstream of the exhaust turbine.

A low pressure EGR system may recirculate exhaust gases to the engine intake at a location either upstream or downstream of the intake compressor. In a low pressure EGR system where recirculated exhaust is delivered to the intake upstream of a compressor, particulate matter in the recirculated exhaust can damage the compressor. To help prevent such damage, the low pressure EGR system may draw exhaust from a location downstream of a particulate filter such that particulate matter is removed from the exhaust before it reaches the low pressure EGR intake. However, failure of the particulate filter may occur, in which case particulate matter in the exhaust may damage the intake compressor, EGR cooler, charge air cooler, and/or other engine components.

The inventors herein have realized that particulate damage to an engine may be avoided or lessened in an apparatus having an internal combustion engine, a compressor for compressing engine intake gases, a particulate filter for filtering particulate matter from engine exhaust, an exhaust gas recirculation (EGR) system for recirculating exhaust gases from a location downstream of the particulate filter to a location upstream of the compressor, and a particulate filter function detector configured to detect a failure of particulate filter, by performing a method of operating the engine including receiving a signal from the particulate filter function detector, comparing the signal from the particulate filter function detector to a predetermined signal threshold, determining if the signal received from the particulate filter function detector meets a predetermined condition relative to the predetermined signal threshold; and reducing a flow of exhaust gas through the EGR system if the signal meets the predetermined condition.

BRIEF DESCRIPTION OF THE DRAWINGS

FIG. 2 shows a flow diagram of a method of operating an internal combustion engine.

DETAILED DESCRIPTION OF THE DEPICTED EMBODIMENTS

Figure 1:
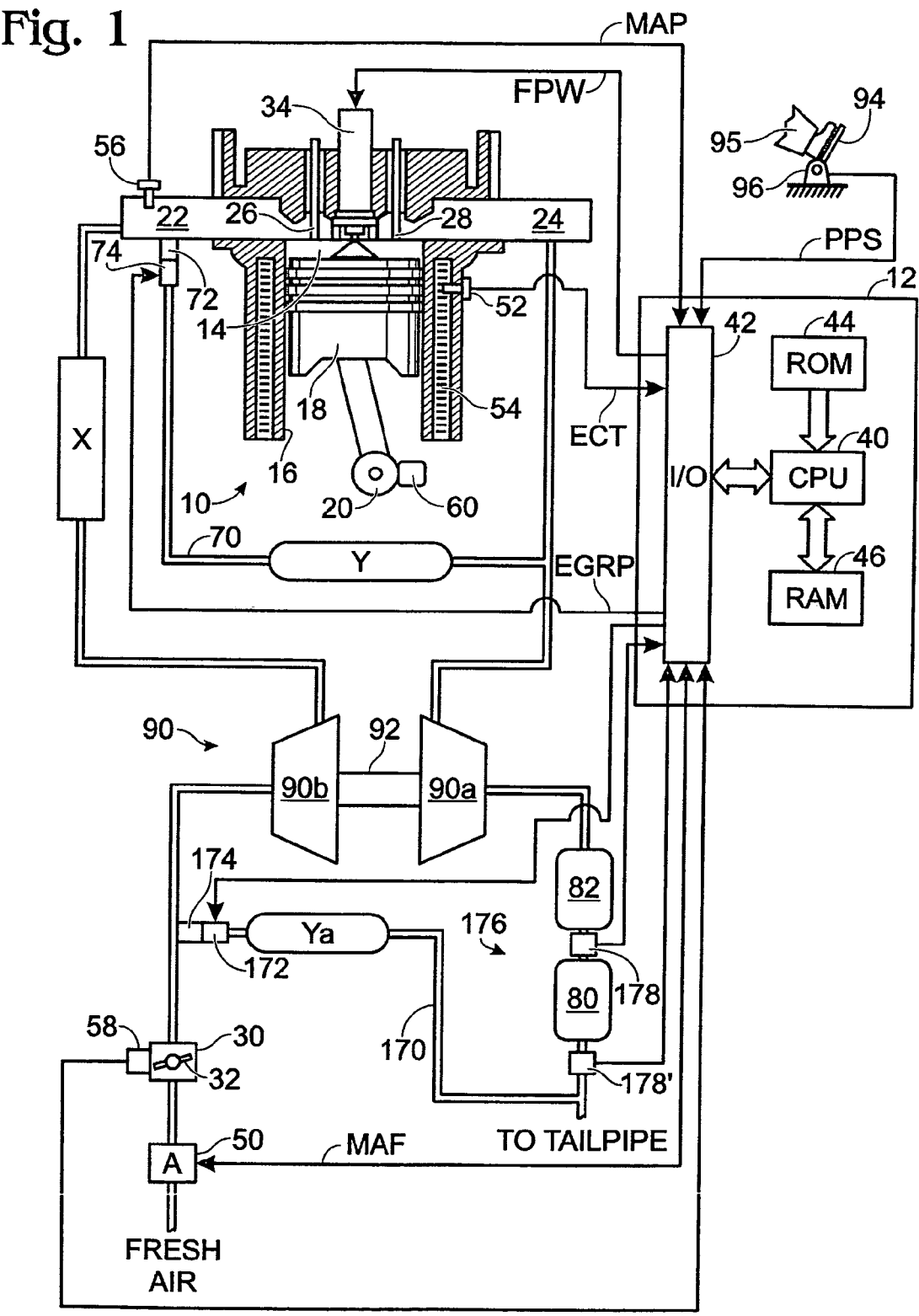
FIG. 1 shows a schematic depiction of an embodiment of a turbocharged internal combustion engine.

FIG. 1 shows an example of a diesel engine system generally at 10. Specifically, internal combustion engine 10 comprises a plurality of cylinders, one cylinder of which is shown in FIG. 1. Engine 10 is controlled by electronic engine controller 12. Engine 10 includes combustion chamber 14 and cylinder walls 16 with piston 18 positioned therein and connected to crankshaft 20. Combustion chamber 14 communicates with an intake manifold 22 and an exhaust manifold 24 via respective intake valve 26 and exhaust valve 28.

Intake manifold 22 communicates with throttle body 30 via throttle plate 32. In one embodiment, an electronically controlled throttle can be used. In one embodiment, the throttle is electronically controlled to periodically, or continuously, maintain a specified vacuum level in intake manifold 22. While throttle body 30 is depicted as being upstream of a compressor device 90b, it will be appreciated that the throttle body may be placed upstream or downstream of the compressor. The choice may depend partly on the specific EGR system or systems that is/are used. Alternatively, or additionally, a throttle body may be placed in the exhaust line to raise exhaust pressure. This may be effective in helping to drive EGR, but may not be effective in reducing total mass flow through the engine.

Combustion chamber 14 is also shown having fuel injector 34 coupled thereto for delivering fuel in proportion to the pulse width of signal (fpw) from controller 12. Fuel is delivered to fuel injector 34 by a conventional fuel system (not shown) including a fuel tank, fuel pump, and fuel rail (not shown). In the case of direct injection engines, as shown in FIG. 1, a high pressure fuel system is used such as a common rail system. However, there are several other fuel systems that could be used as well, including but not limited to EUI, HEUI, etc.

In the depicted embodiment, controller 12 is a conventional microcomputer, and includes a microprocessor unit 40, input/output ports 42, electronic memory 44, which may be an electronically programmable memory in this particular example, random access memory 46, and a conventional data bus.

Controller 12 receives various signals from sensors coupled to engine 10, including but not limited to: measurements of inducted mass airflow (MAF) from mass airflow sensor 50 coupled to the air filter [A on FIG. 1]; engine coolant temperature (ECT) from temperature sensor 52 coupled to cooling jacket 54; a measurement of manifold pressure (MAP) from manifold pressure sensor 56 coupled to intake manifold 22; a measurement of throttle position (TP) from throttle position sensor 58 coupled to throttle plate 32; and a profile ignition pickup signal (PIP) from Hall effect sensor 60 coupled to crankshaft 20 indicating engine speed.

Engine 10 may include an exhaust gas recirculation (EGR) system to help lower $NO_x$ and other emissions. For example, engine 10 may include a high pressure EGR system in which exhaust gas is delivered to intake manifold 22 by a high pressure EGR tube 70 communicating with exhaust manifold 24 at a location upstream of an exhaust turbine 90a of a compression device 90, and communicating with intake manifold 22 at a location downstream of an intake compressor 90b of compression device 90. A high pressure EGR valve assembly 72 is located in high pressure EGR tube 70. Exhaust gas travels from exhaust manifold 24 first through high pressure EGR valve assembly 72, and then to intake manifold 22. An EGR cooler [shown at Y in FIG. 1] is located in high pressure EGR tube 70 to cool recirculated exhaust gases before entering the intake manifold. Cooling is typically done using engine water, but an air-to-air heat exchanger may also be used.

Engine 10 may also include a low pressure EGR system. The depicted low pressure EGR system includes a low pressure EGR tube 170 communicating with exhaust manifold 22 at a location downstream of exhaust turbine 90a, and communicating with intake manifold 22 at a location upstream of intake compressor 90b. A low pressure valve assembly 172 is located in low pressure EGR tube 170. Exhaust gas in the low pressure EGR loop travels from turbine 90a through a catalytic device 82 (for example, a diesel oxidation catalyst and/or $NO_x$ trap) and a diesel particulate filter 80 before entering low pressure EGR tube 170. A low pressure EGR cooler Ya may be positioned along low pressure EGR tube 170.

In some alternate embodiments, catalytic device 82_may be located downstream of particulate filter 80. In this case, the low pressure EGR could be extracted before or after the catalytic device 82. In yet other alternate embodiments, particulate filter 80 may also act as an oxidation catalyst, in which case catalytic device 82 and particulate filter 80 may be combined into a single part.

High pressure EGR valve assembly 72 and low pressure EGR valve assembly 172 each has a valve (not shown) for controlling a variable area restriction in high pressure EGR tube 70 and low pressure EGR tube 170, which thereby controls flow of high pressure and low pressure EGR, respectively.

Vacuum regulators 74 and 174 are coupled to high pressure EGR valve assembly 72 and low pressure EGR valve assembly 72, respectively. Vacuum regulators 74 and 174 receive actuation signals from controller 12 for controlling the valve positions of EGR valve assembly 72 and bypass valve assembly 76. In a preferred embodiment, high pressure EGR valve assembly 72 and low pressure EGR valve assembly 172 are vacuum actuated valves. However, any type of flow control valve or valves may be used such as, for example, an electrical solenoid powered valve or a stepper motor powered valve.

Compression device 90 can be a turbocharger or any other such device. The depicted compression device 90 has a turbine 90a coupled in the exhaust manifold 24 and a compressor 90b coupled in the intake manifold 22 via an intercooler [shown at X in FIG. 1], which is typically an air-to-air heat exchanger, but could be water cooled. Turbine 90a is typically coupled to compressor 90b via a drive shaft 92. (This could also be a sequential turbocharger arrangement, single VGT, twin VGTs, or any other arrangement of turbochargers that could be used, and could include coolers within the compression device system such as between 2 stages of compression).

Further, drive pedal 94 is shown along with a driver's foot 95. Pedal position sensor (pps) 96 measures angular position of the driver actuated pedal.

Further, engine 10 may also include exhaust air/fuel ratio sensors (not shown). For example, either a 2-state EGO sensor or a linear UEGO sensor can be used. Either of these can be placed in the exhaust manifold 24, or downstream of devices 80, 82 or 90.

It will be understood that the depicted diesel engine 10 is shown only for the purpose of example, and that the systems and methods described herein may be implemented in or applied to any other suitable engine having any suitable components and/or arrangement of components.

As shown in FIG. 1, low pressure EGR is typically extracted downstream of the particulate filter. This is done in order to protect the intake system from damage. For example, a turbocharger may fail if soot flows into the compressor due to the tight tolerances between the compressor wheel blades and the wheel housing, as well as to the possible penetration of the bearing seal on the compressor side of the turbocharger by soot. Likewise, soot may coat the walls of the cooler, thereby reducing the effectiveness of the cooler, or may even plug the cooler entirely. This may cause an increase in engine-out emissions, may reduce engine power, and/or may even stall the engine entirely (where the cooler is plugged).

Placing the intake of low pressure EGR tube 170 downstream of particulate filter 80 may help to prevent such particulate damage. However, failure of particulate filter 80 may allow particulate damage to occur even where the intake of low pressure EGR tube 170 is positioned downstream of particulate filter 80. Therefore, a particulate filter function detector 176 may be included to help controller 12 detect degradation and/or failure of particulate filter 80. If controller 12 determines that a failure of particulate filter 80 has occurred, controller 12 may then send a signal to low pressure EGR valve assembly 172 that reduces or shuts off flow of exhaust through low pressure EGR tube 170. Furthermore, controller 12 may prevent the flow of EGR through low pressure EGR tube 170 from resuming or increasing until particulate filter 80 has been repaired or replaced (or other corrective action has been taken).

Particulate filter function detector 176 may be configured to detect a gross failure of particulate filter 80 (i.e. a functional detector), or may be configured to measure, either directly or indirectly, a level or concentration of particulate matter in the exhaust stream (i.e. a threshold detector). The use of a threshold detector may allow the detection of small cracks or degradations in particulate filter 80 that increase levels of soot in the exhaust only slightly. In either case, controlling the flow of EGR through low pressure EGR tube 170 in response to detecting a gross failure or degradation of particulate filter 180 may help to prevent damage to compressor 90, cooler Ya, cooler X and/or other components caused by increased EGR soot levels. It will be appreciated that, even where low pressure EGR valve assembly 172 is shut completely due to a failure of particulate filter 80, exhaust gases may still be recirculated through high pressure EGR valve assembly 72.

Any suitable detector or detectors capable of distinguishing between a properly functioning and an improperly functioning particle filter may be used as particulate filter function detector 176. For example, particulate filter function detector 176 may include pressure sensors 178, 178' positioned upstream and downstream of the particulate filter, or a single pressure differential detector (not shown), for detecting a difference between exhaust gas pressures upstream and downstream of the particulate filter. Alternatively, particulate filter function detector 176 may include a single particulate sensor (not shown) disposed downstream of the particulate filter for detecting a concentration of particulate matter in the exhaust gases, or particulate sensors (not shown) disposed upstream and downstream of the particulate filter for detecting a difference in particulate concentrations upstream and downstream of the particulate filter. It will be appreciated that these sensors and sensor arrangements are set forth merely for the purpose of example, and that any other suitable sensors and/or arrangement of sensors may be used as particulate filter function detector 176.

FIG. 2 illustrates, generally at 100, an embodiment of a method of controlling a flow of recirculated exhaust gas through a low pressure EGR system. Method 100 may be performed by processor 40 via the execution of instructions stored in memory 44 and/or 46. Method 100 includes, at 102, receiving a signal from the particulate filter function detector, and then at 104, comparing the signal from the particulate filter function detector to a predetermined signal threshold. If the signal from the particulate filter function detector is below the predetermined threshold, then method 100 ends. However, if the signal from the particulate filter function detector is equal to or above the predetermined threshold, then method 100 includes reducing or shutting off the flow of recirculated exhaust gas through the low pressure EGR system.

The threshold to which the signal from the particulate filter function detector is compared may have any suitable value or level. For example, where the particulate filter function detector indicates only gross failures of the particulate filter, the threshold to which the signal is compared may be at a level or value reached or exceeded only by a signal from the particulate sensor produced by a gross failure. Likewise, where the particulate detector is capable of distinguishing between small changes in soot levels (i.e. can detect degradation as opposed to failure), the threshold may be set, for example, at a signal level that signifies a particulate concentration that may cause damage to engine components, whether or not such a level represents a gross particulate filter failure.

While method 100 indicates that the low pressure EGR valve is shut off when the signal from the particulate detector is greater than or equal to a predetermined threshold, it will be appreciated that any other suitable relationship between the threshold and the signal from the particulate detector may be used to trigger the reduction in low pressure EGR. For example, in some embodiments, depending upon the electrical characteristics of the particulate detector, a decrease in a magnitude of a signal from the particulate detector may signal an increase in exhaust particulate concentration. Therefore, in these embodiments, the low pressure EGR valve may be shut off when the signal drops to a level less than (or less than or equal to) the predetermined threshold.

In some embodiments, the signal from the particulate filter function detector may be used by a vehicular on-board diagnostic system to alert a vehicle operator of a failure of the particulate filter, for example, by illuminating a warning light. In these embodiments, the same signal that is used to alert the vehicle operator of the failure may also be used to trigger the shut off of and/or disabling of the low pressure EGR system. In other embodiments, different particulate levels may be used to trigger the on-board diagnostic warning to the vehicle operator and to trigger the shutoff of the low pressure EGR system. In either case, the engine may be configured to adjust operating conditions upon shutoff of the low pressure EGR system to prevent an increase in $NO_x$ emissions caused by the low pressure EGR shutoff.

The actions taken by the engine to prevent an increase in $NO_x$ emissions may depend upon the particular EGR system or systems used in the engine. For example, in engines with only low pressure EGR and no high pressure EGR, $NO_x$ emissions may be controlled while the low pressure EGR loop is shut off, for example, by retarding fuel injection or utilizing a split injection strategy, or by reducing the maximum torque output of the engine ("de-rating" the engine) to compensate for the extra torque the engine could potentially produce in the absence of EGR. De-rating the engine may offer the additional benefit of ensuring the safety of the transmission while the EGR is shut off.

In engines with both low pressure and high pressure EGR, $NO_x$ emissions may be controlled while the low pressure EGR loop is shut off by increasing the flow of high pressure EGR, implementing a late and/or split fuel injection strategy (in which at least some fuel is injected into the combustion chamber at a late timing), and or reducing the maximum torque output of the engine. It will be appreciated that these emissions control strategies are merely exemplary, and that any other suitable strategy for decreasing $NO_x$ emissions may be employed while the flow of exhaust gases through the low pressure EGR system is reduced or shut off. Furthermore, adjustments of flows through the intake throttle and/or other adjustments may be used to help prevent compressor surge while the flow of low pressure EGR is reduced or shut off. It will be noted that these actions may not be enough to compensate for the loss of low-pressure EGR. In such a case, the action may be accompanied by a signal to turn on the OBD light indicating a failure.

As mentioned above, in some embodiments, instead of shutting off the flow of exhaust gas through the low pressure EGR system upon detecting particulate filter failure or degradation, the flow of exhaust gas through the low pressure EGR system may be reduced, but not completely shut off. For example, the flow of exhaust gas through the low pressure EGR system may be varied as a function of the signal from the particulate detector. Where the signal from the particulate detector indicates only a slight degradation in filter performance, the flow of exhaust through low pressure EGR tube may be reduced, but not shut off completely, whereas the flow may be shut off completely if the particulate detector signal indicates a more major failure of the particulate filter.

It will be appreciated that the methods described herein may be performed with standard engine and diagnostic system components, and without the addition of any hardware to the system. Furthermore, it will be appreciated that the methods herein may allow manufacturers to realize cost savings, for example, in preventing warranty repairs of turbocharger systems caused by particulate filter failure.

It will further be appreciated that the embodiments of systems and methods disclosed herein are exemplary in nature, and that these specific embodiments are not to be considered in a limiting sense, because numerous variations are possible. The subject matter of the present disclosure includes all novel and non-obvious combinations and subcombinations of the various systems and methods for protecting intake compressors, coolers, and other engine parts from particulate damage, as well as other features, functions, and/or properties disclosed herein. The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the systems and methods for protecting an engine from particulate damage, and/or other features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

I claim:

1. In an apparatus having an internal combustion engine, a compressor for compressing engine intake gases, a particulate filter for filtering particulate matter from engine exhaust, and an exhaust gas recirculation (EGR) system, a method of operating the engine, comprising:
   recirculating exhaust gases through an EGA loop from a location downstream of the particulate filter to a location upstream of the compressor;
   reducing a flow of recirculated exhaust gas through the EGR loop in response to structural degradation including cracks in the particulate filter resulting in an increase of particulate matter through the compressor; and
   adjusting at least one operating condition of the engine to prevent or reduce an increase in $NO_x$ emissions in response to said reducing the flow of exhaust gas.

2. The method of claim 1, wherein said operating condition comprises utilizing a split injection strategy.

3. The method of claim 1, wherein said operating condition comprises reducing a maximum torque output of the engine.

4. The method of claim 1, wherein reducing the flow of exhaust gas from a location downstream of the particulate filter to the location upstream of the compressor includes shutting off the flow of exhaust gas from a location downstream of the particulate filter to the location upstream of the compressor.

5. The method of claim 1, further comprising alerting a vehicle operator of said structural degradation.

6. The method of claim 1, further comprising increasing a flow of exhaust gas through another EGR loop from a location upstream of the particulate filter to a location downstream of the compressor upon reducing the flow of gas through the EGR loop from the location downstream of the particulate filter to the location upstream of the compressor.

7. The method of claim 1, wherein said operating condition comprises retarding fuel injection.

8. The method of claim 1, wherein said structural degradation is determined based on a concentration of particulate matter downstream of the particulate filter.

9. The method of claim 8, wherein said structural degradation is further determined based on a concentration of particulate matter in an exhaust stream upstream of the particulate filter.

10. In an apparatus having an internal combustion engine, a compressor for compressing engine intake gases, a particulate filter for filtering particulate matter from engine exhaust, an exhaust gas recirculation (EGR) system for recirculating exhaust gases from a location downstream of the particulate filter to a location upstream of the compressor, and a particulate filter function detector for monitoring a performance of the particulate filter, a method of operating the engine, comprising:
   detecting gross structural failure in the particulate filter resulting in an increase of particulate matter through the compressor, where the increase of particulate matter associated with gross structural failure is greater than an increase of particulate matter associated with degradation in the particulate filter;
   reducing a flow of exhaust gas through the EGR system in response to detecting said gross structural failure; and
   adjusting at least one operating condition of the engine to prevent or reduce an increase in $NO_x$ emissions in response to said reducing flow of exhaust gas.

11. The method of claim 10, wherein adjusting cormprises utilizing a split injection strategy.

12. The method of claim 10, wherein adjusting comprises retarding fuel injection.

13. The method of claim 10, wherein reducing the flow exhaust gas through the EGR system includes shutting off the flow of exhaust gas through the EGR system.

14. The method of claim 10, wherein detecting gross structural failure in the particulate filter further comprises detecting a concentration of articulate matter in an exhaust stream downstream of the particulate filter.

15. The method of claim 14, wherein detecting structural failure of the particulate filter pressure further comprises detecting a pressure difference between exhaust as pressures upstream and downstream of the particulate filter.

16. An apparatus, comprising:
    an internal combustion engine;
    a compressor for compressing intake gases for the engine;
    a particulate filter for filtering particulate matter from engine exhaust;
    a first exhaust gas recirculation (EGR) system for recirculating exhaust from downstream of the particulate filter to upstream of the compressor;
    a second exhaust gas recirculatlon (EGR) system for recirculating exhaust from upstream of the particulate filter to downstream of the compressor;
    a particulate filter function detector configured to detect structural degradation including cracks in the particulate filter resulting in an increase of particulate matter through the compressor; and
    a controller in electrical communication with the particulate filter function detector and the first and second EGR systems, wherein the controller is configured to reduce a flow of exhaust gas through the first EGR system and increase a flow of exhaust gas through the second EGR system in response to degradation in the particulate filter resulting in an increase of particulate matter through the compressor.

17. The apparatus of claim 16, wherein the controller is configured to shut off the flow of exhaust through the first EGR system in response to structural degradation including cracks in the particulate filter resulting in an increase of particulate matter through the compressor.

18. The apparatus of claim 16, wherein the controller is configured to adjust at least one operating condition of the engine to prevent or reduce an increase in NOx emissions if the signal meets said condition of particulate filter degradation.

19. The apparatus of claim 16, wherein the operating condition comprises utilizing a split injection strategy.

20. The apparatus of claim 16, wherein the operating condition comprises reducing a maximum torque output of the engine.

21. The apparatus of claim 16, wherein the operating condition comprises retarding fuel injection.

22. The apparatus of claim 16, further comprising an indicator configured to alert a vehicle operator of said structural degradation.

23. The apparatus of claim 16, wherein the particulate filter function detector includes a particulate sensor disposed downstream of the particulate filter.

24. The apparatus of claim 23, wherein the particulate filter function detector further includes a pressure differential detector for detecting a difference between exhaust gas pressures upstream and downstream of the particulate filter.

* * * * *

UNITED STATES PATENT AND TRADEMARK OFFICE
CERTIFICATE OF CORRECTION

PATENT NO. : 7,284,366 B2 Page 1 of 1
APPLICATION NO. : 11/238969
DATED : October 23, 2007
INVENTOR(S) : Eric Kurtz It is certified that error appears in the above-identified patent and that said Letters Patent is hereby corrected as shown below:

In column 8, line 49, delete "16" and insert --18-- therefor.

In column 8, line 51, delete "16" and insert --18-- therefor.

In column 8, line 54, delete "16" and insert --18-- therefor.

Signed and Sealed this

Second Day of June, 2009

JOHN DOLL
*Acting Director of the United States Patent and Trademark Office*